Aug. 23, 1966    F. BROUWER ETAL    3,268,731
PHOTOSENSITIVE CALIBRATED KERF CONTROL
Filed Feb. 11, 1964    3 Sheets-Sheet 1

INVENTORS
Frans Brouwer
Frank L. Sobchak

By
Attorney

INVENTORS
Frans Brouwer
Frank L. Sobchak

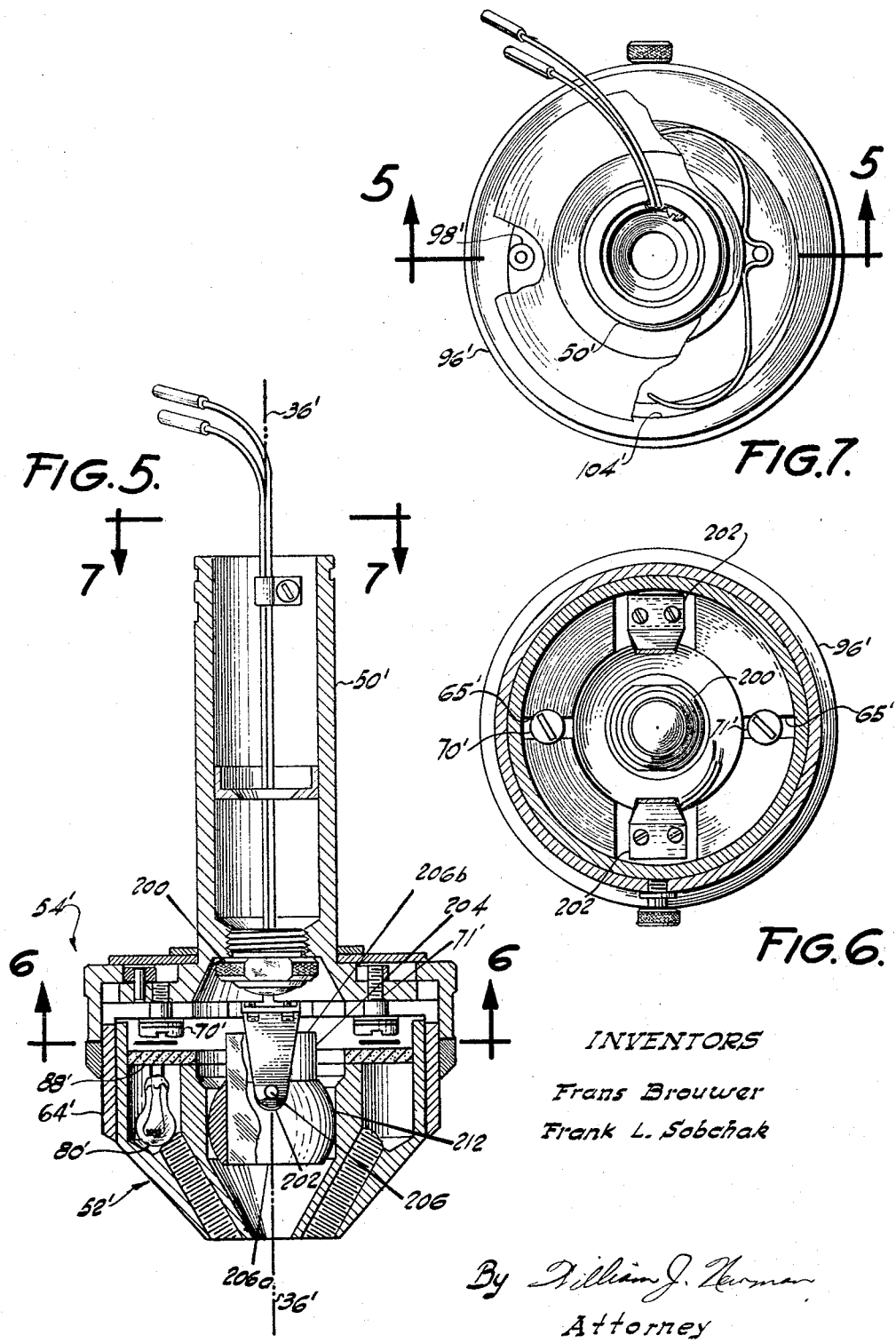

United States Patent Office 3,268,731
Patented August 23, 1966

3,268,731
PHOTOSENSITIVE CALIBRATED KERF CONTROL
Frans Brouwer, Glencoe, and Frank L. Sobchak, Chicago, Ill., assignors to Stewart-Warner Corporation, Chicago, Ill., a corporation of Virginia
Filed Feb. 11, 1964, Ser. No. 344,107
3 Claims. (Cl. 250—202)

This invention relates to automatic tracing equipment. More particularly, it relates to automatic line tracing equipment for guiding machine tools such as torch cutters and 2-dimensional milling machines along a prescribed path and is a continuation-in-part of copending application, Serial No. 187,069, filed April 12, 1962, now Patent No. 3,128,383.

A torch cutting machine or a 2-dimensional milling machine uses a cutting tool of finite dimensions. Where such a tool follows a given controlled path, only the center of the tool describes this path accurately and the parts obtained are either smaller or larger than desired depending upon whether the inside or the outside of the cut is used. To compensate for this it has been customary in torch cutting techniques to allow in the original drawing of the part for the material lost in the kerf or the width of the cut made by the flame. Obviously half the kerf width has to be compensated for. In 2-dimensional milling techniques where the radius of the cutter tool must be compensated, the technique of allowing for compensation within the original drawings is not customary. Here the machine is usually equipped with an offset mechanism which holds either the cutting tool or the optical scanner at a distance equal to the radius of the cutter from the controlled path.

The techniques utilized in torch cutting to make the compensation allowance in the original drawings permits no control of the kerf adjustments by the machine operator. There has therefore been developed techniques in which adjustments are made within the equipment sensing the line. For example, the photosensing head may be eccentrically mounted with respect to its rotational axis in the manner shown by the patent to Berry, U.S. 2,499,178. Other methods include placing the photocell eccentrically, displacing the center scan of a vibrating type of scanner eccentrically, or placing the projecting lens eccentrically with respect to the rotational axis of the sensing head. An example of the latter type may be seen in copending application Serial No. 56,920, filed September 19, 1960, now Patent No. 3,124,691. The present invention is an improvement in the technique disclosed therein wherein the projecting lens is adjustably positioned eccentric to the rotating axis of the sensing head.

It is an object of this invention to provide novel means for adjusting the offset caused by the finite dimensions of a working tool when used with an automatic pattern tracer.

It is also an object of this invention to provide novel means for compensating for the tool width offset by adjusting the eccentricity of the image projecting means with respect to the axis of rotation of the sensing head.

It is a further object of this invention to provide means for compensating for tool width offset which have an accurate but simple vernier adjustment.

Another object of this invention is to provide a novel means for compensating for the tool width offset by adjusting the eccentricity of the image projecting means and the pattern illumination means with respect to the axis of rotation of the sensing head.

Other objects and advantages of this invention will become apparent upon a further study of this application especially when taken in view of the accompanying drawings, in which:

FIG. 5 is a vertical section view of another embodiment of the tool width offset compensator assembly;

FIG. 6 is a horizontal section take nalong the line 3—3 of FIG. 5; and

FIG. 7 is a horizontal section view taken along the line 7—7 of FIG. 5.

Briefly, the tool width offset compensators of this invention comprise a support member which is rigidly mounted with respect to the line scanning means and is rotatable therewith about a central axis. A first member surrounds and is rotatable with respect to the support member and defines a pair of inner circular cylindrical surfaces, the axes of which are noncoextensive with one another and are parallel to the axis of rotation of the scanning means. One of the cylindrical surfaces of the first member is maintained in engagement with a cam follower mounted on the support member. Means including a lens or a prism for projecting an image of the line on the scanning means has an outer cylindrical surface meeting with hte other of said circular cylindrical surfaces on the support means. It is supported by screws extending through radial slots therein and fastened to the support member so that rotation of the first member will cause movement of the image projecting means while the screw and slot arrangement prevents rotational movement thereof with respect to the support member.

Figure 1:
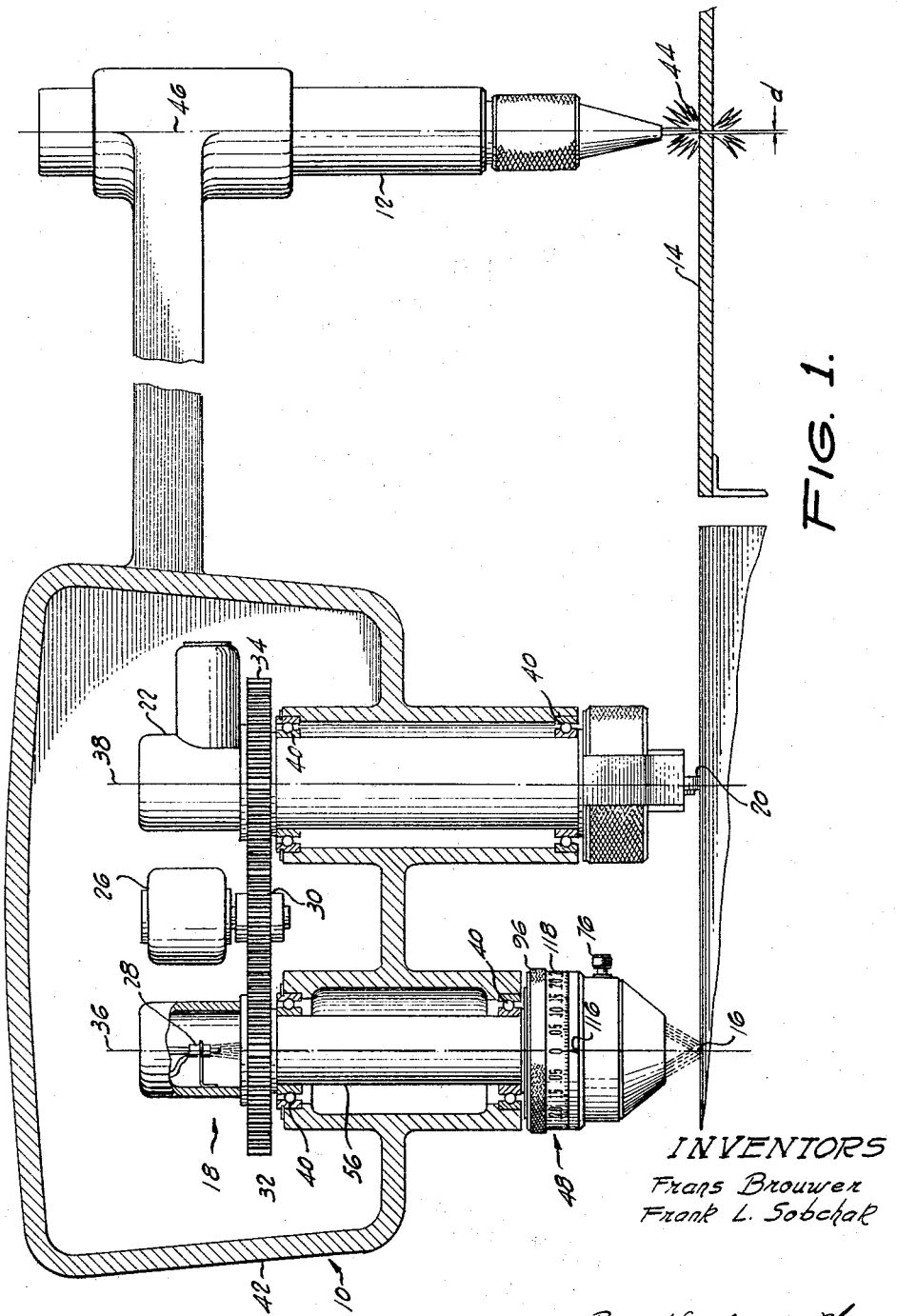
FIG. 1 is a vertical section view of a sensing head used in a torch cutting machine which includes a scanning head including a tool width offset compensator assembly embodying the teachings of this invention.

Referring now to FIG. 1 there is shown a tracing head 10 in use with a torch cutter 12 for cutting a pattern in a work piece 14 in accordance with a line pattern 16 being veiwed by the scanning head 18. The tracer 10 and, hence, the torch cutter 12 are driven along the path of the viewed line 16 by means of a traction wheel 20 which is separately powered by a motor 22 forming a part of the driving head 24. Steering of the tracer is accomplished by means of a motor 26 which is driven in accordance with electric signals generated by a photosensitive scanner 28 in a manner such as described in the copending application to Brouwer hereinbefore mentioned. When the scanning head 18 is not aligned with the pattern, the motor 26 is energized in a direction and velocity commensurate with the deviation to rotate, by means of pinion gear 30 and drive gears 32 and 34, the scanning head 18 and the driving head 22, respectively, to guide the unit towards the line.

The scanning head 18 and the driving head 22 are rotatable about their respective axes 36 and 38 by means of roller bearings 40, or the like, journaling the respective heads in the case 42 of the tracer. The driving head 24 steers the tracer 10 so that the rotational axis 36 of the scanning head 18 follows accurately the pattern 16. Since the axis 36 represents a fixed reference with respect to the casing 42 of the tracer 10, the torch 12 attached to the casing will follow the same pattern. The flame of the torch cutter 12, however, has a finite width and will thus produce a cut 44 in the work piece of a finite width. Only the center of the flame represented by the axis 46 traces accurately the pattern 16 so that the work piece 14 being cut will be larger or smaller than desired by the amount D between the axis 46 and the edge of the cut 44. The distance D is overcome by means of an adjustable tool offset compensator assembly 48 forming a part of the scanning head 18.

One embodiment of the tool width offset compensator assembly 48 (FIG. 2) comprises a support member 50, a focal and illuminating assembly 52 and a cam mechanism 54 which provides the manual adjustment between the support member 50 and the illuminating and focusing assembly 52 for controlling the tool width offset compensation as hereinafter described. The support member 50 is a circular sleeve 56 having at its bottom end a circular flange 58 which carries and supports the remainder of the offset compensator assembly. Adjacent the upper end of the sleeve 56 is a pair of annular grooves 60 and 62 which receive means for locking the scanning head drive gear 32 thereto in a well known manner.

The focal and illuminating assembly 52 comprises a first inverted cup-shaped member or adaptor ring 64 having a pair of radially aligned slots 66 (FIG. 4) in its base portion 68. A pair of radially aligned screws 70 and 71 pass through the slots 66 and threadedly engage the flange 58 on the support member 50. Lock washers 72 help to secure the cup-shaped member 64 so that it may be readily translated along the radius defined by its slots 66 and the screws 70 and 77 while being held from rotational translation with respect to the support member 50. A lens 67 is maintained centrally by the base of the adaptor ring 64. The frame 69 holding the lens 67 threadedly engages an aperture in the adaptor ring 64 for easy removal therefrom.

A lamp housing 74 fits within the adaptor ring 64 and is maintained in position by a thumb screw 76 which is tightened to hold the adaptor ring and lamp housing in frictional engagement. The thumb screw 76 fits within a slot 78 in the adaptor ring 64 so that when it is loosened the lamp housing 74 will drop. This feature facilitates the replacement of expired lamps 80 and the cleaning of lens 82.

The lamp housing 74 comprises a cylindrical upper portion 82 and a frusto-conical lower section 84. There is a central bore 86 therewithin with a frusto-conical inner-surface 88 at the lower end. The upper end of the housing 74 is counterbored to form a wide shoulder 86 upon which rests a printed circuit fiber-board 88 having sockets therein to receive lamps 80 which reside in cavities 90 formed in the shoulders 86. There are preferably six lamps 80 spaced about the lamp housing 74 and they are connected through the pivotal circuitry to leads 87 to provide power therefor. There is a tapped hole 92 formed between each of the cavities 90 and the bottom surface 94 of the housing 74. The passages 92 are angled to focus the light from the lamps 80 into a spot at the focal point of the lens 67 and they are tapped to prevent light reflection from the sides of the holes.

It may be seen that with the above described construction the lamps and the lens 67 are rigidly mounted with respect to each other for radial movement defined by the slots 66 in the annular ring and the screws 70. Thus the focal point of the lens is always illuminated by a spot of light created by the beams of each of the lamps 80.

The radial translation of the focal and illuminating assembly 52 is provided by the cam means 54 which includes a cam ring 96 and a cam follower 98 secured to the flange 58 of the support member 50. The cam ring 96 defines a first internal cylindrical surface 100 which is in mating engagement with the cylindrical outer surface of the adaptor ring 64. The cam ring 96 has a flange 102 which defines a second internal cylindrical surface 104. As may be seen in FIG. 3 the central axis 106 of the second cylindrical surface 104 is offset a short distance from the central axis 108 of the cam ring 96 and, hence, the first inner-cylindrical surface 100.

The eccentrically aligned cylindrical surface 104 is held in engagement with the cam follower roller 98 by means of a specially adapted spring element 110 which engages the protruding end of screw 71 located radially opposite the cam follower.

The tool width offset compensator operates to move the focal and illuminating assembly 52 in a radial direction with respect to the remainder of the pattern tracer 10 in the following manner. The support body 50 being rotatably mounted within the casing 42 defines the reference line 36 through its axis of rotation. The slot 66 and screws 70 and 71 permit the radial translation of the focal and illuminating assembly 52 but prevent rotation thereof with respect to the support body 50. Therefore, rotation of the cam ring 54 with respect to the support member 50 and the focal and illuminating assembly 52 will cause the radial translation by virtue of its eccentrically aligned cylindrical surfaces 100 and 104.

The total length of radial translation per unit rotation of the cam ring is determined by the amount of offset between the axis 106 of the cam cylindrical surface 104 and axis 108 of the cylindrical bearing surface 100. Therefore, an accurate control of the radial translation is provided because a large angular translation of the cam ring 54 will provide but a small radial translation of the focal and illuminating assembly. The cam ring 54 has a graduated scale 118 and there is provided an indicator mark 116 on a ring 112 fixed about the adaptor ring 64 of the focal and illuminating assembly. Rotation of the cam ring 54 to align the desired offset on the graduated scale with the indicator mark 116 will result in the desired radial displacement of the lens from the central axis to compensate for tool width. Set screws 114 securing the indicator ring 112 to the adapter ring 64 permits the ring to be angularly adjusted therewith for calibration purposes.

The embodiment of FIGURES 5 through 7 is similar to the compensator assembly of FIGURES 2 through 4 with modifications as hereinafter described. Thus, similar components will have similar primed reference numbers.

The support member 50' is substantially the same as the support member 50 of the first embodiment except that it has fixedly threaded therein a lens 200 which magnifies the projected image on the light sensitive means 28 in the scanner head 18 (FIG. 1). Also, a pair of brackets 202 are fixedly mounted on the bottom of the circular flange 58'. The brackets 202 support a prism 204 for rotation about an axis 206 which is perpendicular to and intersects the central axis 36' of the support member 50'.

The prism 204 comprises a cylinder of transparent material such as glass or plastic having oppositely facing parallel surfaces 206a and 206b which are normally aligned perpendicular to the central axis 36'.

The assembly 52' is similar to the focal and illuminating assembly 52 of the first embodiment except that it does not carry the lens 67. It includes the lamps 80' and the printed circuit board 88' as well as an adapter ring 64' which mates with the cam mechanism 54' to provide radial translation thereof. An inner surface 210 cooperates with a spherically-surfaced member 212 carried by the prism 204 so as to cause the prism 204 to rotate about its axis 206 responsive to radial translation of the assembly 52'.

Figure 4:
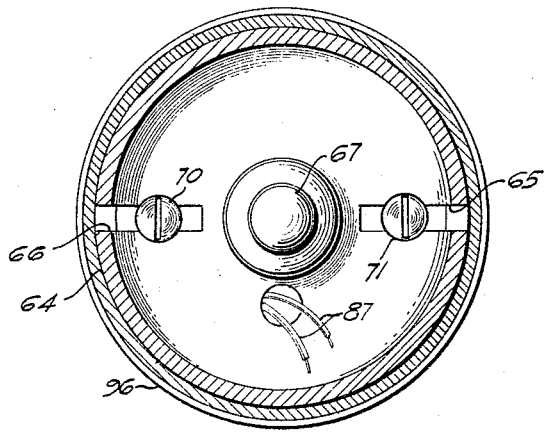
FIG. 4 is a horizontal section view taken along the line 4—4 of FIG. 2.
Figure 2:
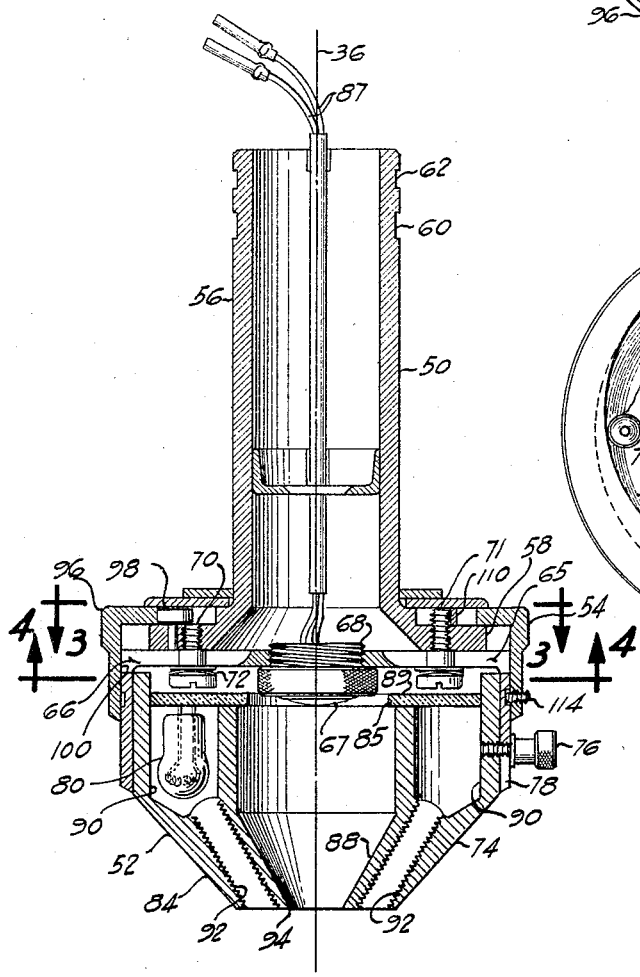
FIG. 2 is a vertical section view of one embodiment of the tool width offset compensator assembly.
Figure 3:
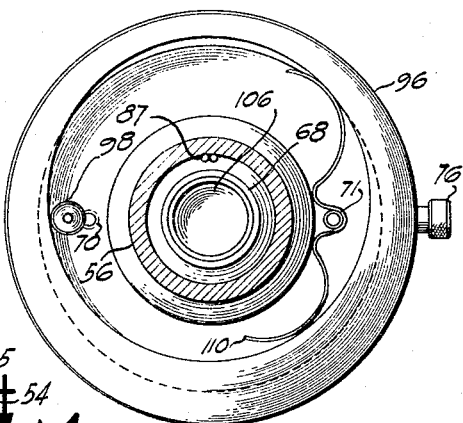
FIG. 3 is a horizontal section view taken along the line 3—3 of FIG. 2.

The cam assembly mechanism 54' is identical with that shown in FIGURES 2 through 4 and operates to cause radial translation of the assembly 52' by rotation of the cam ring 96' with respect to the support member 50'. The cam surface 104' cooperates with the cam follower 98' to translate the assembly 52' along the direction of the radial slots 65' with which the bolts 70' and 71' interact.

It may thus be seen that rotation of the cam ring 96' causes radial translation of the assembly 52' which cooperates with the spherically surfaced member 212 to cause rotation of the prism 204 about axis 206 with respect to the support member 50'. The prism surfaces 206a and 206b are deflected from their perpendicular position with respect to the central axis 36' and light rays passing therethrough are refracted to a position parallel to but displaced from their original position with respect to the axis 36'. A vernier control which is highly accurate is thereby provided for adjusting the image for tool width compensation.

While there has been described herein two preferred embodiments of the invention, it is to be understood that many modifications and/or improvements may be made thereto. It is, therefore, intended that the invention be limited only by the scope of the appending claims.

What is claimed is:

1. A device for adjusting tool width offset compensation in a line tracer having scanning means including a light sensitive device and means defining a center of scan and a central axis passing approximately therethrough comprising a support member rigidly mounted with respect to said scanning means, a first member rotatably mounted on said support member and defining a pair of circular cylindrical surfaces the axes of which are non-coextensive with one another and parallel to said central axis, a follower member mounted on said support in engagement with one of said surfaces, a lens fixedly attached with respect to said support member, a prism mounted on said support member for rotation about an axis perpendicular to and intersecting said central axis, and means having a cylindrical surface mating with the other of said circular cylindrical surfaces for rotating said prism about its axis of rotation.

2. A scanner head for a pattern tracer comprising a body member defining a central axis, scanning means within said body having a light sensitive device and means defining a center of scan in approximate alignment with said axis, a support flange member carried by said body, a cylindrical member having a flange defining an inner circular cam surface and an inner cylindrical bearing surface surrounding said support member, the axis of said cam surface and the axis of said inner bearing surface being non-coextensive with one another and parallel with said central axis, a cam follower carried by said support member engageable with said cam surface, resilient means for maintaining engagement between said cam follower and said cam surface, a lens fixedly attached to said body member with its focal axis coextensive with said central axis, a prism having oppositely facing parallel surfaces mounted on said body member for rotation about an axis parallel to said facing surfaces and perpendicularly intersecting said central axis; an assembly having an outer bearing surface mating with said inner bearing surface means on said assembly defining a pair of radially aligned slots, means in engagement with said support flange member and passing through said slots, and means on said assembly in engagement with said prism for rotating said prism about its axis of rotation responsive to rotation of said cylindrical member.

3. A scanner head for a pattern tracer comprising a body member defining a central axis, scanning means within said body having a light sensitive device and means defining a center of scan in approximate alignment with said axis, a circular plate member secured to said body normal to and axially aligned with said central axis, a cylindrical member having an inner cylindrical bearing surface surrounding said plate member and a flange defining an inner circular cam surface, the axis of said cam surface and the axis of said inner bearing surface being non-coextensive with one another and parallel with said central axis, a roller carried by said plate member engageable with said cam surface, a pin carried by said plate member diametrically opposite said roller, a spring constrained between said pin and said cam surface to hold said roller against said cam surface, a lens fixedly attached to said body member with its focal axis coextensive with said central axis, a prism having oppositely facing parallel surfaces mounted on said body member for rotation about an axis parallel to said facing surfaces and perpendicularly intersecting said central axis; an assembly having an outer bearing surface mating with said inner bearing surface means on said assembly defining a pair of radially aligned slots, means in engagement with said support flange member and passing through said slots, and means on said assembly in engagement with said prism for rotating said prism about its axis of rotation responsive to rotation of said cylindrical member.

References Cited by the Examiner
UNITED STATES PATENTS

| | | | |
|---|---|---|---|
| 1,773,021 | 8/1930 | Alldridge | 98—18 X |
| 1,793,698 | 2/1931 | Jones | 95—18 X |
| 2,208,420 | 7/1940 | Gulliksen | 250—202 X |
| 2,933,612 | 4/1960 | Cheverton et al. | 250—202 |
| 3,037,888 | 6/1962 | Lobosco et al. | 250—202 X |
| 3,128,383 | 4/1964 | Brouwer et al. | 250—202 |
| 3,135,857 | 6/1964 | Von Voros | 250—202 X |

RALPH G. NILSON, *Primary Examiner.*

WALTER STOLWEIN, *Assistant Examiner.*